United States Patent
Ghoshal et al.

(10) Patent No.: US 9,060,276 B1
(45) Date of Patent: Jun. 16, 2015

(54) PROVIDING SERVICE TO A PORTABLE ELECTRONIC DEVICE USING ALLOWED NETWORK CODES

(71) Applicant: Sprint Communications Company L.P., Overland Park, KS (US)

(72) Inventors: Jagannath Ghoshal, Overland Park, KS (US); John Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 173 days.

(21) Appl. No.: 13/872,069

(22) Filed: Apr. 27, 2013

(51) Int. Cl.
*H04W 12/06* (2009.01)
*H04W 48/02* (2009.01)

(52) U.S. Cl.
CPC .............. *H04W 12/06* (2013.01); *H04W 48/02* (2013.01)

(58) Field of Classification Search
CPC ..................................................... H04W 48/02
USPC ........................................................ 455/411
See application file for complete search history.

(56) References Cited

U.S. PATENT DOCUMENTS

| 7,966,014 | B1* | 6/2011 | Manroa .......................... 455/433 |
| 8,270,966 | B1* | 9/2012 | Vargantwar et al. ........... 455/423 |
| 8,406,756 | B1 | 3/2013 | Reeves et al. |
| 8,411,643 | B1* | 4/2013 | Sigg et al. ...................... 370/331 |
| 8,923,212 | B2* | 12/2014 | Nanda et al. ................... 370/329 |
| 2012/0026865 | A1* | 2/2012 | Fan et al. ....................... 370/225 |
| 2014/0040975 | A1* | 2/2014 | Raleigh et al. ..................... 726/1 |
| 2014/0187199 | A1* | 7/2014 | Yan et al. ....................... 455/410 |
| 2014/0235201 | A1* | 8/2014 | Gurajala et al. ............... 455/406 |

* cited by examiner

*Primary Examiner* — Asghar Bilgrami

(57) ABSTRACT

Systems and methods for providing voice services and/or data services to a portable electronic device. The portable electronic device has an application in its memory that compares an available network code to a list of blocked network codes. If the available network code is on the list of blocked network codes, the application may send a notification that service is not available or may see if a different network code is on the list of blocked network codes. If the available network code is not on the list of blocked network codes, voice and/or data services may be provided to the portable electronic device by the telecommunications service provider associated with the available network code.

17 Claims, 6 Drawing Sheets

PROVIDING SERVICE TO A PORTABLE ELECTRONIC DEVICE USING ALLOWED NETWORK CODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may be associated with a particular telecommunications service provider that provides at least domestic service to the device. This service may be provided as part of a subscription that is paid periodically or paid by use. In some cases, a user may need the portable electronic device to function while the device is considered to be roaming, domestically or internationally, in order to access voice services, data services, or a combination of both.

SUMMARY

In an embodiment, a method of a portable electronic device receiving telecommunications services from a telecommunications service provider comprising: identifying, by a roaming application on a portable electronic device, a set of blocked network codes; selecting, by the roaming application, at least one network code of a plurality of network codes; and comparing, by the roaming application, the selected network code to the set of blocked network codes, wherein the plurality of blocked network codes comprises network codes that are not authorized to connect the portable electronic device to the at least one of voice services or data services. The embodiment further comprising connecting, by the roaming application, the portable electronic device to a telecommunications service provider associated with the selected network code in response to a determination that the selected network code is not on the list of blocked network codes.

In an alternate embodiment, a method of a portable electronic device receiving telecommunications services from a telecommunications service provider comprising: maintaining, by a portable electronic device, a set of blocked network codes; determining, by a roaming application on the portable electronic device, if a selected available network code is a blocked network code by comparing the network code to the set of blocked network codes; and connecting, by the roaming application, in response to a determination that the selected available network code is not a blocked network code, the portable electronic device to the telecommunications service provider network associated with the selected available network code. The embodiment further comprising selecting, by the roaming application, in response to a determination that the selected available network code is a blocked network code, a different available network code; and sending, by the roaming application, to a call origination application the portable electronic device, in response to a determination that both the selected available network code and the different available network code are on the blocked list of network codes, a notification that service is not available to the portable electronic device.

In an embodiment, a portable electronic device capable of receiving services from a telecommunications service provider comprising: a memory; a processor; and a wireless transceiver configured to communicate with a plurality of telecommunications service providers, a roaming application stored in the memory that, when executed by the processor selects a network code from a plurality of network codes; determines if the selected network code can be associated with a portable electronic device by comparing the selected network code to a list of blocked network codes, wherein the list of blocked network codes is one of stored in the memory on the portable electronic device or in the roaming application; and wherein the network code can be associated with the portable electronic device if the network code is not on the list of blocked network codes.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
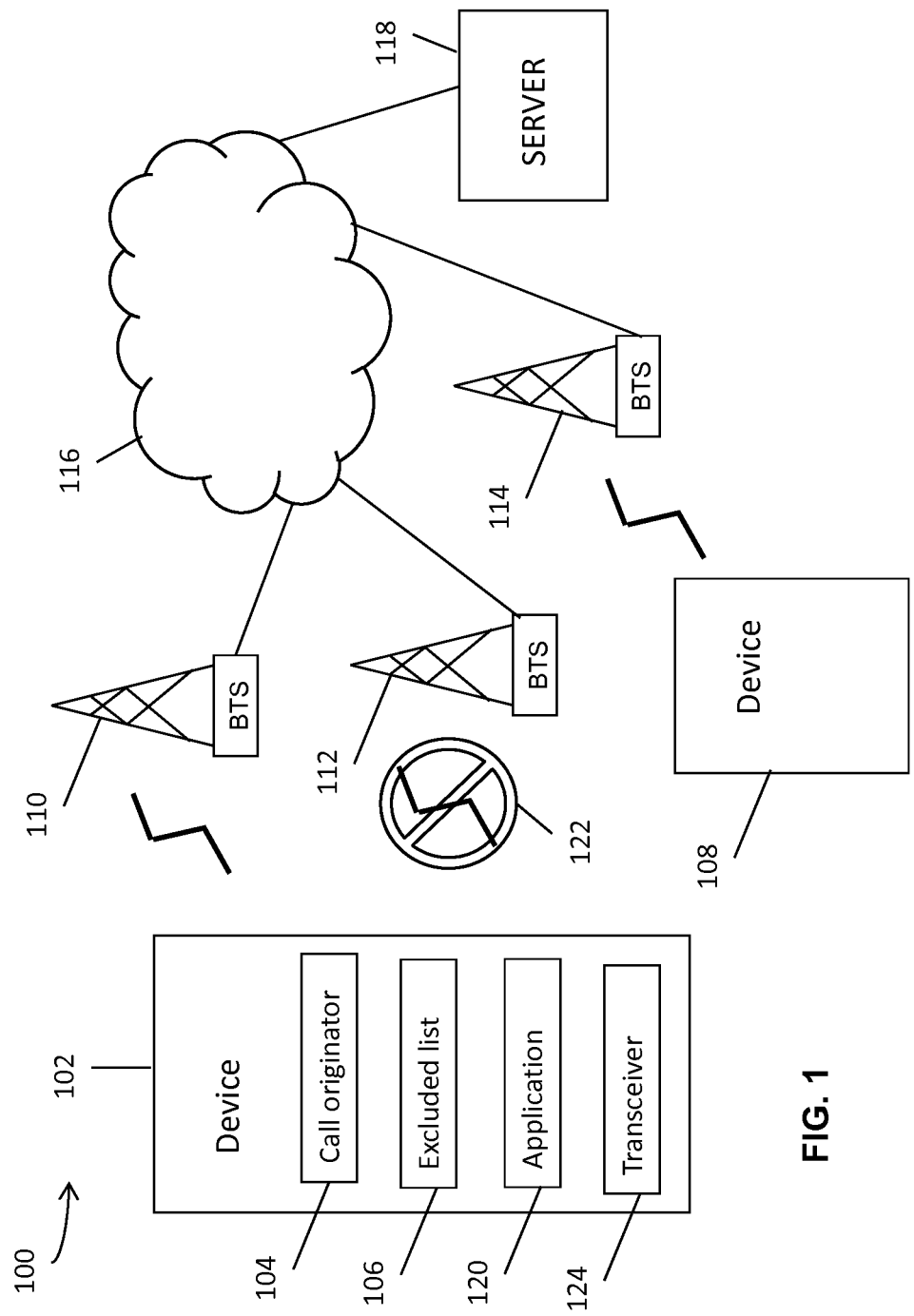
FIG. 1 is an illustration of a system for providing service to a portable electronic device according to embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications service providers may offer subscription services some of which are paid monthly and some of which employ contracts for predetermined periods of time. In addition, pre-paid or pay-as-you-go subscription services may be offered and may provide voice services, data services, or both. In some embodiments, the portable electronic device is one of a mobile phone, a tablet, a laptop computer, or a personal digital assistant (PDA). Some subscription services, which may also be referred to as subscription plans, may provide service both domestically and internationally while others may offer separate domestic and international roaming services. A subscription plan may be acquired from a telecommunications service provider by a user of a portable electronic device or of multiple portable electronic devices. It is appreciated that the user could be an individual user or a corporate user that purchases a plan for multiple employees or varying plans for varying tiers of employees. This plan may cover some or all functionalities of multiple portable electronic devices including voice services, data services, short messaging services (SMS), and text messaging. This telecommunications service provider may be referred to as a primary telecommunication services provider ("primary provider"). A device, as known to those skilled in the art, is said to be roaming when it establishes a wireless communication link with a base transceiver station that is operated by a service provider who is not the primary provider. A device may roam, for example, when it is located in a geographical area where the primary provider does not operate cell towers and hence does not provide wireless coverage.

When a portable electronic device is unable to connect to receive voice or data services from the primary telecommunications service provider's network, this may be because the device is unable to connect to the primary telecommunications service provider's network. A device may be unable to connect to the primary telecommunications service provider's network because of the location of the device, because of restrictions from the primary telecommunications service provider, because of a null in the coverage of a cell tower (a coverage hole, for example due to an obstruction or radio interference), or other reasons. Conventionally, a mobile device may use an available network code to determine if the device can receive voice services and/or data services from a provider associated with the available network code if a device is not able to connect to the primary telecommunications service provider's network. In the present disclosure, network codes are instead being leveraged to disallow access to the telecommunications service providers' networks with which they are associated. When the mobile device attempts to establish service with a provider other than the primary provider, the device detects or selects an available network code. An application on the device asks not whether the available network code is associated with an allowed provider, but whether the network code is associated with a disallowed provider. A provider may be disallowed because, for example, because a primary provider may not want a device associated with a particular type of plan, for example, a pre-paid plan, to be able to roam domestically or to be able to roam on certain networks where it is not financially beneficial to the primary provider. However, the primary telecommunications service provider may allow international roaming but may want to define the telecommunications service providers that provide voice and/or data services to the device. As discussed in detail below, a mobile device can determine if an available network code is part of a group of blocked network codes. Using the systems and methods disclosed herein, the user of the portable electronic device benefits because the device is allowed some roaming access, and that access can be designed by the primary telecommunications service provider to create a positive revenue stream. This positive revenue stream may be generated by the primary telecommunications service provider permitting access to other telecommunications service providers based on contractual agreements for roaming and/or specific service charges that create a positive revenue stream for the primary provider, in contrast with other providers where there are no agreements or where agreements would not be financially beneficial to the primary provider. In an embodiment, this roaming access may be possible because a SIM card or other removable media is coupled to the portable electronic device.

In the event that a portable electronic device cannot connect to the primary telecommunications service provider's network, an application on the portable electronic device may look for available network codes to use to provide service to the device if voice or data services are requested by the portable electronic device. However, an available network code may or may not be an allowed network code, the difference being that allowed network codes are permitted to be used by the device by the primary telecommunications network while available network codes are merely those codes available for connection without consideration of whether the codes are allowed by the primary telecommunications service provider. Network codes may be allowed or disallowed (blocked) by the primary telecommunications provider to limit domestic and/or roaming connections. A telecommunications service network may be associated with a plurality of network codes, sequential or otherwise, and devices may be provided voice and/or data services by a telecommunications provider by way of a network code that may authorize the connection of the device to the provider associated with that network code. In one example, a network code may be "100" or "1020" or another numeric code, in other examples, the network code may be an alpha or an alphanumeric code such as "SIDC," "MJS", "or other variations and may have more than four characters. In addition, a contiguous range of codes may be used, for example, "100"-"1020" or "EJS"-"MJS", where all codes between 100 and 1020 would be included and all alpha codes starting with E-M in the alphabet and ending with JS would also be included.

The primary telecommunications service provider may want to provide and/or limit domestic or international roaming services to the portable electronic device. In some cases, the primary telecommunications service provider may only want to provide access to domestic or international roaming services and not both, or may only provide data or voice services depending upon if the device is roaming domestically, internationally, or in specific locations domestically and/or internationally. Each telecommunications service provider including the primary telecommunications service provider may be associated with a plurality of network codes that may provide voice and/or data services both domestically and internationally. If a portable electronic device is provided access to voice and/or data services by a telecommunications provider associated with one of these network codes, the device may operate on at least the network of the telecommunications service provider associated with the network code.

However, a primary telecommunications service provider may not want a device, for example, a device associated with a particular type of subscription service such as a pre-paid plan, to have both domestic and international roaming access. In that example, the primary telecommunications service provider may create a list of individual blocked network codes or sets/contiguous ranges of blocked network codes. This list may be stored in the memory of the portable electronic device or in an application, for example, a roaming application, on the device. The portable electronic device, using for example the roaming application, may detect when a request for voice services or data services is made by the portable electronic device and may determine what network codes affiliated with telecommunications service providers that provide service to the device in the location of the device are available to authorize access to the associated telecommunications service provider. This determination may include comparing a first available network code to the list of blocked network codes. If the first available network code is not on the list of blocked network codes, that network code is associated with the portable electronic device and the telecommunications service provider, which may or may not be the same as the primary provider, provides at least one of voice or data services to the portable electronic device.

In an alternate embodiment, if the first network code is determined by the application to be on the list of blocked network codes, the roaming application may select a second network code and again determine if the second network code is on the blocked list. This process may continue until an available network code that is not the blocked list is found, or for a predetermined number of cycles, a predetermined time period, or a combination of a predetermined number of cycles during a predetermined time period. In some embodiments, the roaming application may display a notification on the device that no service is available. This notification may be displayed in response to the first attempt to determine if the first available network code is on the blocked list, or in response to a subsequent number of failed attempts and/or failed attempts during a predetermined time period. In another embodiment, subsequent attempts to determine if an available network code is on the blocked list may be made automatically after a predetermined time period has passed since a last attempt, where the last attempt may have been a first attempt or a subsequent attempt or a specific attempt number.

FIG. 1 is an illustration of a system 100 for providing service to a portable electronic device according to embodiments of the disclosure. System 100 comprises a first portable electronic device 102 that has a call originator application 104, a wireless transceiver 124, and an application 120. In an embodiment, the application 120 may be referred to as a roaming application. In some embodiments, the system 100 may comprise an excluded or blocked list 106. The excluded or blocked list 106 comprises a list of network codes that identify wireless networks that the device 102 is not permitted to access. This list may be generated by the primary telecommunications service provider that offers and/or supports the device 102. In some embodiments, this support may be due to a subscription plan or service that may be contractual, pay as you go, pre-paid, or combinations thereof. Each network code may be associated with at least one telecommunications service provider of a plurality of telecommunications service providers.

A first base transceiver station 110 may communicate wirelessly with the portable electronic device 102. In an embodiment, the first base transceiver station 110 is associated with the primary telecommunications service provider where the portable electronic device 102 may have a subscription service. A second base transceiver station 112 may be associated with a different telecommunications provider and may be prohibited 122 from communicating with the portable electronic device 102. In an embodiment, the base transceiver station 112 may not be permitted 122 to communicate with the portable electronic device 102 when that device is roaming domestically, internationally, or both. This may be because the device is not compatible with the services provided, because the primary telecommunications service provider has prohibited communication, or both. In an embodiment, if the first base transceiver station 110 is in wireless communication with the portable electronic device 102, it may connect through the network 116 using, for example, the wireless transceiver 124 to a base transceiver station 114 to another portable electronic device 108 for, for example, voice services, or to a server 118 that may provide data services to the device 102. In an embodiment, the call origination application 104 may receive a notification from the roaming application 120 that service is not available to the portable electronic device.

Figure 2:
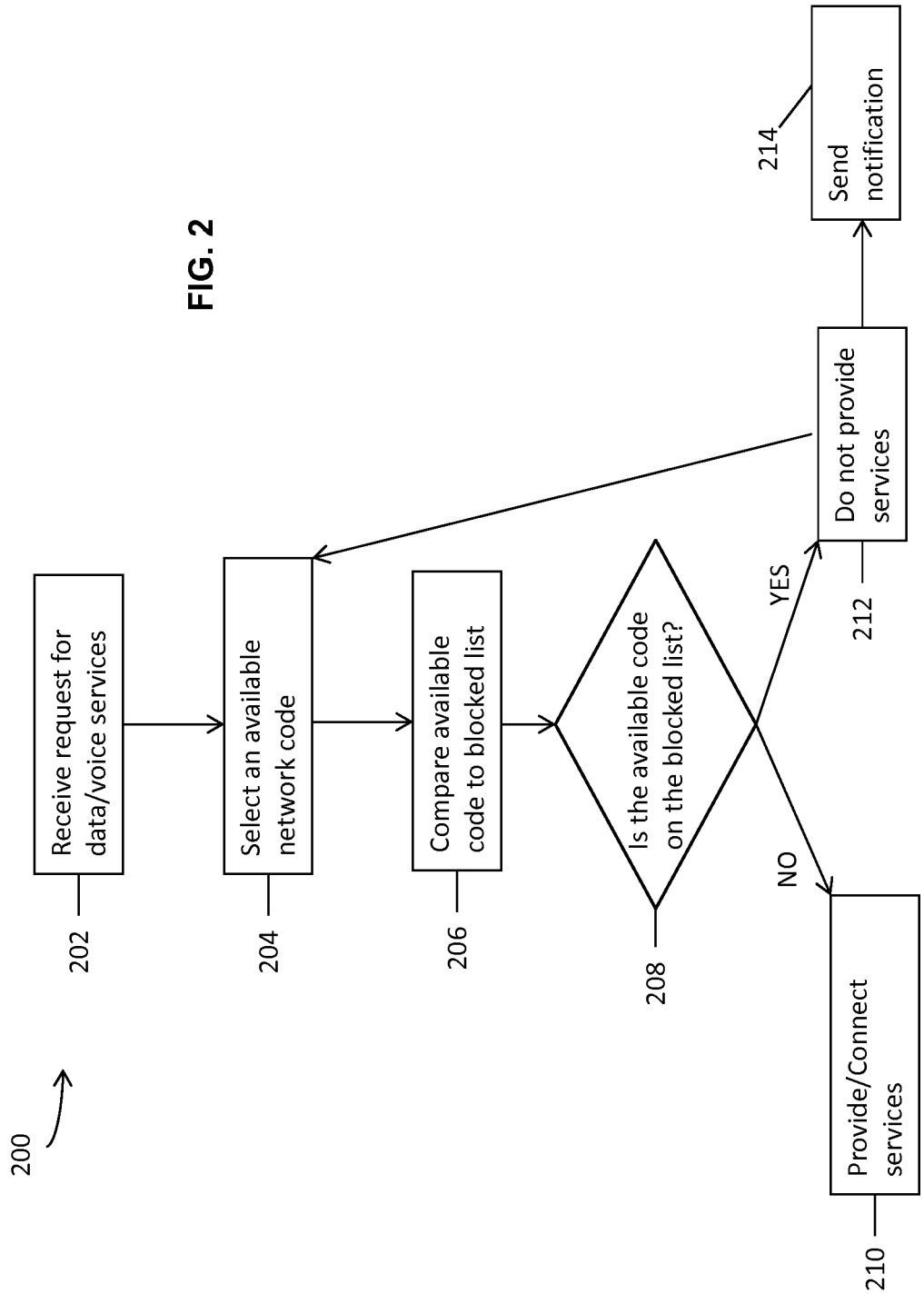
FIG. 2 is a flow chart of a method of providing service to a portable electronic device according to embodiments of the present disclosure.

FIG. 2 is a representation of a portable electronic device receiving services from a telecommunications service provider according to embodiments of the present disclosure. Method 200 may be executed on a portable electronic device with a subscription plan that is contract, pay-as-you-go, pre-paid, or combinations thereof. The portable electronic device may purchase this plan from a telecommunications service provider that may be referred to as a primary telecommunications service provider. At block 202, a roaming application on a portable electronic device receives a request from another application of the device for at least one of data or voice services. In an embodiment, the roaming application may receive the request at block 202 because the portable electronic device is roaming domestically or internationally. At block 204, the roaming application selects a first available network code which may also be referred to as a first network code. In an embodiment, the selection may be based on a history of use with a particular code or series/contiguous range of codes. In an alternate embodiment, the device's location may impact the selection of the network code to compare to the blocked list discussed below. In another embodiment, the roaming application may determine which telecommunications service providers provide voice and/or data services in the location and/or type of device and identify the network codes of those providers, and then determine if any of those codes are blacklisted.

In an embodiment, an available network code may be a network code that is detected by the portable electronic device or may be a network code suggested to the device by the roaming application. At block 206, the first available network code is compared to a list of blocked network codes. The list of blocked network codes may be stored in a memory on the portable electronic device or may be stored in the roaming application. The list may comprise individual codes, contiguous ranges of codes, or combinations thereof. The list may be updated dynamically, manually, or at periodic predetermined intervals which may be set by the primary telecommunications service provider. The predetermined intervals may be associated with use, time, or combinations thereof. In an embodiment, this list may come as a push from the telecommunications service provider if the roaming application determines that an update is available or that the device is roaming. At block 208, a determination is made by the roaming application as to whether the first available network code is on the blocked list. If the first available network code is not on the blocked list, it is used at block 210 to provide the portable electronic device with at least one of the voice services or data services requested at block 202.

If at block 208 the roaming application determines that the first available network code is on the blocked list, the method proceeds to block 212 and the device does not attempt to access the services of that network. The method may then proceed to back to block 204 where another, different available network code is selected and then to blocks 202 and 208 as discussed above. This method may loop until an available network code is found that is not on the blocked list and the method can proceed to block 210. In an alternate embodiment, after the first attempt at block 204 or after a predetermined number of attempts, a predetermined time period, or a combination thereof, the method proceeds to block 214 where a notification is sent from the roaming application to the device indicating that no service is available.

In an alternate embodiment, a second attempt at block 204 to find another available network code may not be made upon a determination that the first available network code was on the blocked list but rather may be made in response to a predetermined period of time passing or based upon a configurable user setting. In this embodiment, the notification at block 214 may be sent in response to a predetermined number of failed attempts to find an available network code that is not on the blocked list or after a predetermined time period, or a combination of both.

Figure 3:
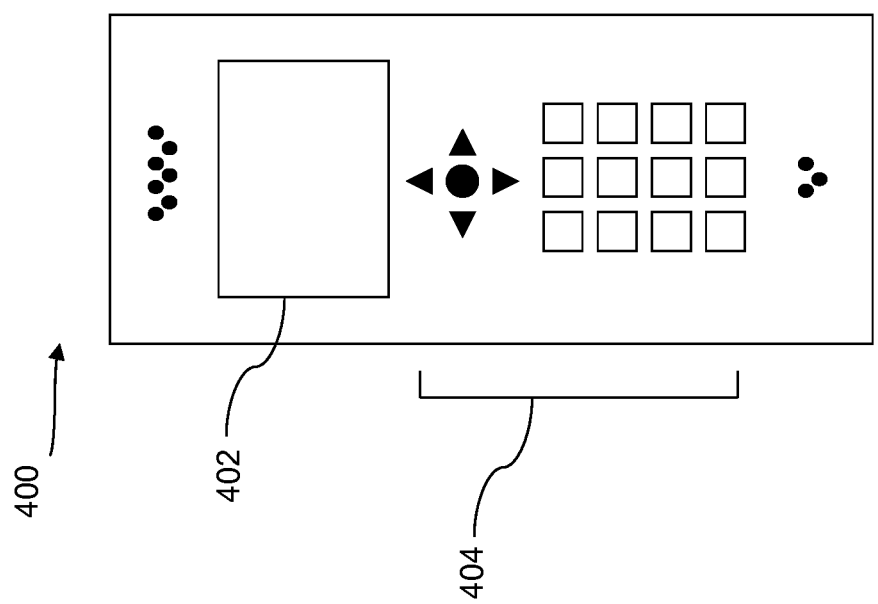
FIG. 3 depicts an illustration of a mobile device operable for implementing aspects of the present disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
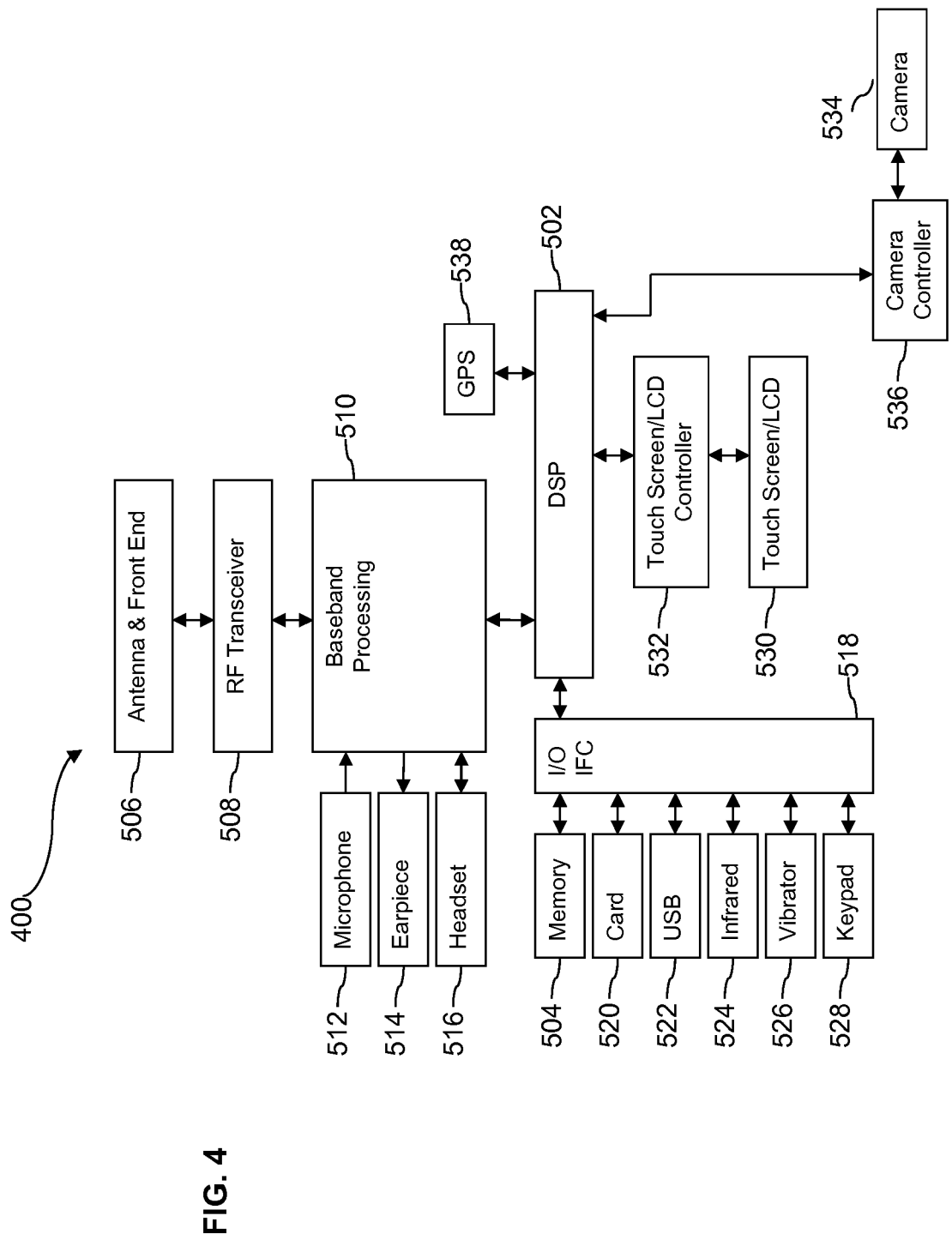
FIG. 4 shows a block diagram of a mobile device operable for implementing aspects of the present disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
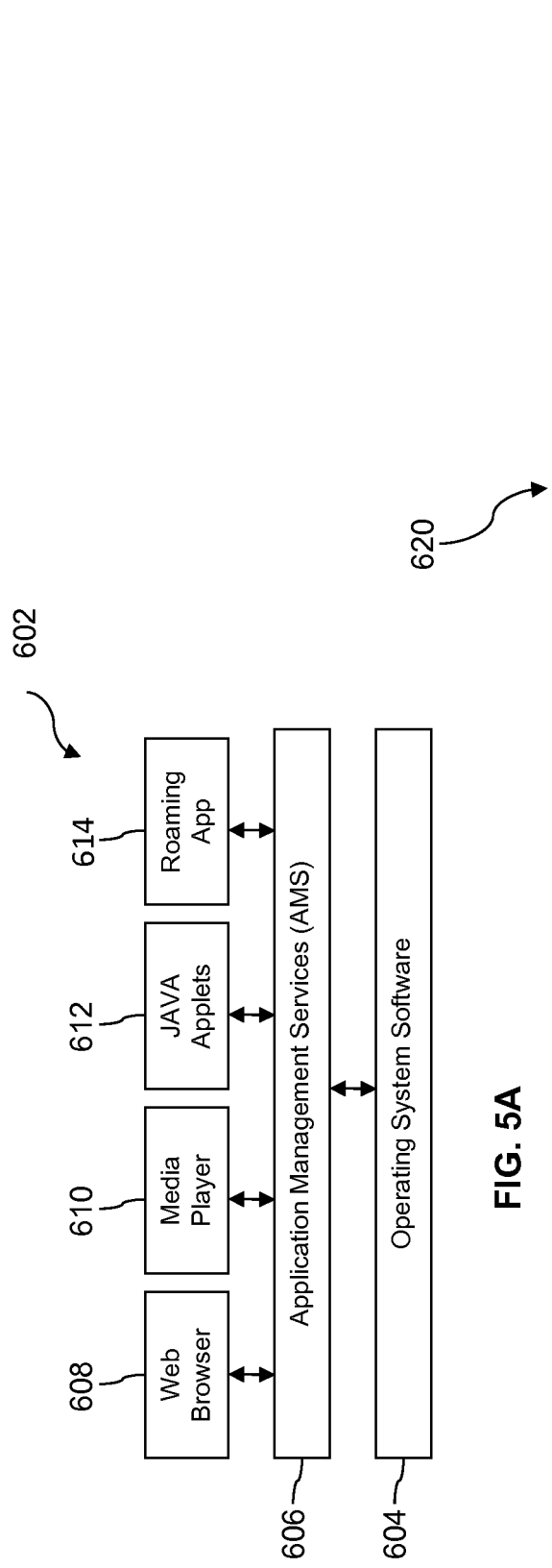
FIG. 5A illustrates a software environment that may be operable for implementing aspects of the present disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, a roaming application 614, and JAVA applets 612. The roaming application 614 may function as discussed above in FIGS. 1 and 2. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
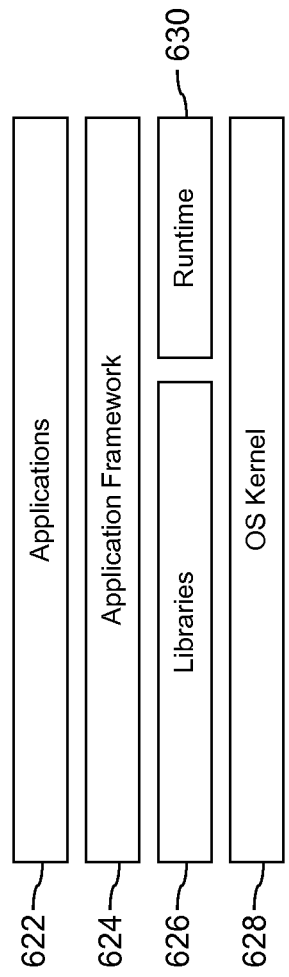
FIG. 5B illustrates an alternative software environment that may be operable for implementing aspects of the present disclosure.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
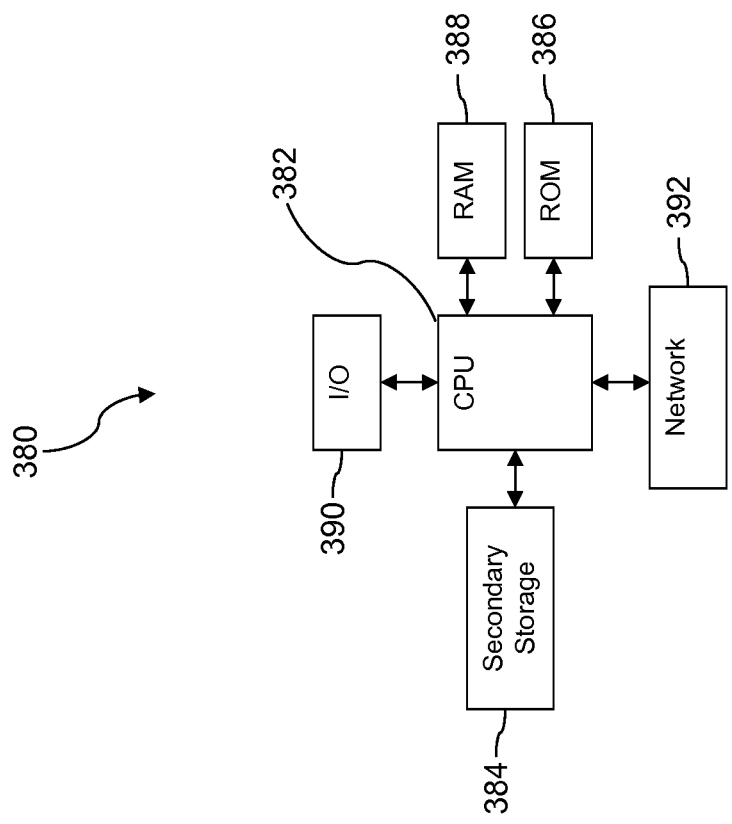
FIG. 6 illustrates an exemplary computer system suitable for implementing the several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of a portable electronic device receiving telecommunications services from a telecommunications service provider comprising:
    identifying, by a roaming application on a portable electronic device, a set of blocked network codes, wherein the set of blocked network codes comprises at least one of numeric or alphanumeric codes;
    selecting, by the roaming application, at least one network code of a plurality of network codes, wherein the selected network code is associated with a roaming telecommunications service provider;
    comparing, by the roaming application, the selected network code to the set of blocked network codes, wherein the plurality of blocked network codes are determined by a primary telecommunications service provider and comprise network codes that are not authorized by the primary telecommunications service provider to connect the portable electronic device to at least one of voice services or data services of roaming telecommunications service providers; and
    connecting, by the roaming application, the portable electronic device to a roaming telecommunications service provider network of the roaming telecommunications service provider associated with the selected network code to establish the at least one of voice services and data services while the portable electronic device is roaming internationally in response to a determination that the selected network code is not on the list of blocked network codes.

2. The method of claim 1, wherein the portable electronic device is associated with a subscription plan, and wherein the subscription plan is provided by the primary telecommunications service provider.

3. The method of claim 1, further comprising selecting, by the roaming application, in response to a determination that the selected network code is a blocked network code, a different network code.

4. The method of claim 3, further comprising determining if the different network code is a blocked network code.

5. The method of claim 4, further comprising connecting, by the roaming application, in response to a determination that the different network code is not a blocked network code, the portable electronic device to a different roaming telecommunications service provider network associated with the different network code.

6. A method of a portable electronic device receiving telecommunications services from a telecommunications service provider comprising:
    maintaining, by a portable electronic device, a set of blocked network codes that are determined by a primary telecommunications service provider wherein the set of blocked network codes comprises at least one of numeric or alphanumeric codes;
    determining, by a roaming application on the portable electronic device, if a selected available network code associated with a roaming telecommunication service provider is a blocked network code by comparing the selected available network code to the set of blocked network codes;
    connecting, by the roaming application, in response to a determination that the selected available network code is not a blocked network code of the set of blocked network codes, the portable electronic device to a roaming telecommunications service provider network of the roaming telecommunication service provider associated with the selected available network code to establish at least one of voice services and data services while the portable electronic device is roaming internationally;

selecting, by the roaming application, in response to a determination that the selected available network code is a blocked network code of the set of blocked network codes, a different available network code; and sending, by the roaming application, to a call origination application on the portable electronic device, in response to a determination that both the selected available network code and the different available network code are part of the set of blocked network codes, a notification that service from the roaming telecommunications service provider network associated with the selected available network code and a different roaming telecommunications service provider network associated with the different available network code are not available to the portable electronic device.

7. The method of claim 6, wherein the roaming application prevents the portable electronic device from accessing telecommunications service associated with each network code of the set of blocked network codes.

8. The method of claim 6, wherein the set of blocked network codes is maintained on at least one of a memory of the portable electronic device or in the roaming application.

9. The method of claim 6, further comprising determining if the different network code is a blocked network code of the set of blocked network codes.

10. The method of claim 6, further comprising sending, by the roaming application to a graphical user interface of the portable electronic device, a notification that no service is available in response to a determination that the different network code is a blocked network code of the set of blocked network codes.

11. The method of claim 10, further comprising connecting, by the roaming application, in response to a determination that the different network code is not a blocked network code of the set of blocked network codes, the portable electronic device to the different roaming telecommunications service provider network associated with the different network code.

12. The method of claim 6, wherein the roaming application continues to select a new available network code until at least one of an available network code that is not part of the set of blocked network codes is selected, a predetermined number of attempts to select a network code are made, a predetermined time passes from a first attempt, a predetermined time passes from a subsequent attempt, or combinations thereof.

13. A portable electronic device capable of receiving services from a telecommunications service provider comprising:
a memory;
a processor; and
a wireless transceiver configured to communicate with a plurality of telecommunications service providers comprising at least one roaming telecommunications service providers;
a roaming application stored in the memory that, when executed by the processor:
selects a network code associated with the at least one roaming telecommunication service provider from a plurality of network codes;
determines if the selected network code can be associated with a portable electronic device by comparing the selected network code to a list of blocked network codes determined by a primary telecommunications service provider, wherein the list of blocked network codes comprises at least one of numeric or alphanumeric codes and is one of stored in the memory on the portable electronic device or in the roaming application; and
associates the network code with the portable electronic device in response to a determination that the network code is not on the list of blocked network codes, wherein in response to the association, the portable electronic device is provided access to at least one of voice service or data service while the portable electronic device is roaming internationally via a roaming telecommunications service provider network of the at least one roaming telecommunication service provider associated with the network code.

14. The system of claim 13, wherein the portable electronic device is one of a mobile phone, a tablet, a laptop computer, or a personal digital assistant (PDA).

15. The system of claim 13, wherein the list of blocked network codes comprises at least one of a list of individually blocked network codes or a list of ranges of blocked network codes.

16. The system of claim 13, wherein the list of blocked codes is updated at least one of dynamically, manually, or periodically.

17. The system of claim 16, wherein the list of blocked codes is updated periodically at predetermined intervals of use, time, or combinations thereof.

* * * * *